Patented June 23, 1925.

1,543,369

UNITED STATES PATENT OFFICE.

CARNIE B. CARTER AND ALBERT E. COXE, OF PITTSBURGH, PENNSYLVANIA, ASSIGNORS TO S. KARPEN & BROS., OF CHICAGO, ILLINOIS, A CORPORATION OF WEST VIRGINIA.

PROCESS OF PRODUCING A PHENOLIC CONDENSATION PRODUCT.

No Drawing. Application filed August 23, 1922. Serial No. 583,914.

*To all whom it may concern:*

Be it known that we, CARNIE B. CARTER and ALBERT E. COXE, citizens of the United States, residing at Pittsburgh, in the county of Allegheny and State of Pennsylvania, have invented a new and useful Improvement in Processes of Producing a Phenolic Condensation Product, of which the following is a specification.

This invention relates to the production of phenolic condensation products; and the primary object is to provide a simple and practicable process for producing such products by reacting upon a phenolic body with an aldehyde dichloride. Such dichlorides are obtainable as by-products when natural gas is subjected to a chlorinating process for the purpose of obtaining, as a principal product, methyl chloride for use in the production of esters, as described in our pending application for Letters Patent of the United States Serial No. 423,870, filed November 13, 1920, which has matured into Patent 1,459,971, Jan. 26, 1923.

The various chlorinated products produced by chlorinating methane or natural gas may be separated in accordance with the method set forth in our application 583,913, filed of even date herewith.

A phenolic body, such as phenol or the cresols, may be condensed with the aldehyde dichlorides of the aliphatic series to form phenolic condensation products. For example, one of the first three members of the homologous series of aldehyde dichlorides may be readily condensed with phenol or cresols, by employing a suitable catalyst, such as ammonia. The first three members of this series are:

Methylene chloride, $CH_2Cl_2$.
Ethylidene chloride, $CH_3CHCl_2$.
Propylidene chloride, $CH_3CH_2CHCl_2$.

Of the three substances named above, the methylene chloride reacts very readily; the ethylidene chloride reacts more slowly; and the propylidene chloride reacts still more slowly—assuming the same conditions.

Even with methylene chloride, the condensation takes place extremely slowly in the absence of a condensing agent. The ordinary alkalies, that is, the alkaline compounds of the alkali metals or alkaline earth metals, will not serve as a condensing agent. Ammonia, however, if present in an amount sufficient to combine with the chlorine that is present in the methylene chloride will enable the condensation of an aldehyde dichloride and a phenolic body to be readily effected.

It is preferred to employ such proportions, in the first instance, as will give a large excess of phenol and enable a fusible phenolic condensation product to be produced. For example, one may use the following proportions:

5 cc. of phenol.
6.4 cc. of concentrated ammonium hydroxide.
2.4 cc. of methylene chloride.

A glass tube may be partially filled with this mixture and then hermetically sealed. The tube may then be put in a heated oil bath and heated thirty minutes at 180° C. The reaction is found to be practically complete at the end of this time. There results a resin in the form of a viscous liquid which forms a layer at the bottom of the tube, and above this is an aqueous layer which carries ammonium chloride which is formed in the reaction. On cooling, the aqueous layer deposits crystalline ammonium chloride copiously and the resin becomes very viscous or semi-solid in character.

The viscous resin may be washed free of ammonium chloride by agitation or by kneading with hot or cold water, after which the excess phenol, or part thereof, may be boiled off or may be blown out at elevated temperature by means of air. The resulting viscous liquid becomes a solid on cooling to ordinary temperatures. If a portion only of the excess phenol be blown off, the resulting resin will be hard and brittle when cold, will be fusible, and will be soluble in aqueous alkalies, alcohol, acetone, ether, etc. In fact, such a resin possesses all the properties of the fusible soluble resins prepared from phenol and formaldehyde or hexamethylenetetramine and the resin may be used in the same manner and for the same purpose as the resins here referred to.

The proportions given above for phenol, ammonia and methylene chloride correspond with the following molecular ratios:

Phenol, 9 mols.
Ammonia, 16 mols.
Methylene chloride, 6 mols.

According to the foregoing, more ammonia is employed than is essential for a complete reaction of the methylene chloride. Only 12 mols. are required in fact, and the reaction proceeds smoothly to completion if only 12 mols. are used. An excess of ammonia does no harm, however, and it is practical to employ an excess to make it certain that there will be sufficient ammonia present to combine with all of the chlorine present in the reaction.

It is not essential that the ammonia be used as concentrated ammonium hydroxide, for example. As a matter of fact, it is desirable when the resin is made in large quantity to employ a more dilute solution. The condensation is accompanied by the evolution of a large amount of heat and in the case of the treatment of large masses of reacting materials, it is desirable to temper the reaction by the presence of water, which may be used advantageously and in considerable quantity.

In practice, the condensation may be performed conveniently in an autoclave. A temperature of 180° C. has been given as a suitable temperature for effecting the condensation. The condensation can be effected in the presence of ammonia at 100° C. in the course of 12 to 24 hours, however. It is desirable to employ a base as a condensing agent. However, an ammonia compound is the only reagent of an alkaline character that is of practical value. The other alkalies, that is, the ordinary alkali metal and alkaline earth metal compounds, possess no value as condensing agents in the present process. Indeed, they have a tendency to prevent complete condensation when present, even though the requisite amount of ammonia be used.

Where the reaction is carried out in an autoclave at a suitable temperature, pressure is developed in the autoclave and the pressure developed may vary according to conditions, that is, with the extent to which the autoclave is filled with the material, the temperature employed, etc.

The preferred method of carrying out the process is to introduce methylene chloride, phenol and aqueous ammonia into an autoclave, the phenol being taken in considerable excess and the ammonia also preferably being taken in some excess; heat the autoclave at a comparatively high temperature, say, a temperature of 180° C., and continue the operation until the reaction is complete. The methylene radicle combines with the phenol; and the chlorine, as it is liberated, combines with the ammonia. Thus, there is produced a fusible, soluble, phenolic condensation product and ammonium chloride.

The materials are expelled from the autoclave into a vessel where a washing operation can be performed, water is passed into this vessel and a suitable kneading or agitation of the materials is effected. After the washing operation, the aqueous ammonium chloride is drawn off into another chamber and the resin is tapped into still another chamber. The aqueous ammonium chloride is then passed into a still where it is treated with hydrated lime, producing aqueous calcium chloride and ammonia. The ammonia may be passed back to a storage tank and from there used again in the autoclave for practicing the process of producing the phenolic condensation product.

The fusible resin preferably is subjected to an operation whereby a portion of the excess of phenol is eliminated. This may be effected by boiling the resin or by blowing air through the heated resin. In this manner, ten per cent or more of the original amount of phenol employed may be removed. Thereafter, the resin may be mixed with a suitable active methylene body, preferably hexamethylenetetramine, or, if desired, formaldehyde, or formaldehyde and ammonia. The amount of the methylene body thus introduced into the resin should be sufficient to give to the final mass about one methylene group to each phenolic group. This mass when subjected to heat will be converted to the final infusible and substantially insoluble phenolic condensation product known to the art. At a suitable stage, fibrous fillers or other fillers may be compounded with the resin, if desired. In the fusible and soluble stage, the resin may be dissolved in an appropriate solvent and used as a varnish, sufficient hexamethylenetetramine or other active methylene body being added to effect the conversion to the final infusible and substantially insoluble state.

Any suitable phenolic body may be employed in the process. Phenol, the cresols and naphthols condense with equal readiness with methylene chloride in the presence of ammonia. The ethylidene and propylidene chlorides react in the same manner but not with the same readiness. Several hours, perhaps six to eight hours, are required to complete the reaction with ethylidene chloride under the conditions stated above; and, in the case of propylidene chloride, the reaction requires a period of more than twenty-four hours heating at 180° C. It seems to be the rule that the reactivity decreases as the size of the alkyl radicle increases. While a temperature of 180° C. has been given as a suitable temperature for these condensations, lower temperatures may be used if desirable. For example, the condensation of methylene chloride with phenol in the presence of ammonia can be effected at a temperature of 100° C. in the course of 12 to 24 hours. The same applies to the condensation of cresols with methylene chloride. If ethylidene or propylidene chloride be used it is more practicable to use the higher temperature.

The ordinary alkalies can not be used to replace ammonia. Indeed, if the ordinary alkalies be used in large amount when ammonium hydroxide is present in theoretical molecular proportions less than the theoretical amount of resin will be obtained as a result of the reaction. As an illustration, one may take the following:

Phenol 9 mols.
Methylene chloride 6 mols.
Sodium hydroxide (30% solution), 12 mols.
Ammonium hydroxide 12 mols.

If these materials be heated at 170 to 180° C. for 25 minutes, the reaction will be complete, that is, all methylene chloride will have reacted. However, such reaction yields only 90 to 95% of the theoretical quantity of resin. Thus, it appears that the ordinary alkali, while it does not prevent the reaction when ammonium hydroxide is present, nevertheless interferes with the reaction in some manner and prevents the full yield of resin. If instead of 12 mols. of ammonium hydroxide only 1 to 2 mols. are used the yield of resin amounts to only a few per cent of the theoretical yield.

On the other hand, any suitable compound of ammonia, such as methyl-amine or ammonium carbonate, may be used in lieu of ammonia. Also, any suitable phenolic body may be employed, including phenol, the cresols, and other higher homologues. In the appended claims where the expression "ammonia" is used, it should be understood to include such compounds of ammonia as may serve as substitutes.

The foregoing detailed description has been given for clearness of understanding only and no unnecessary limitations should be understood therefrom; but the appended claims should be construed as broadly as permissible in view of the prior art.

What we regard as new, and desire to secure by Letters Patent, is—

1. The process of producing a phenolic condensation product which comprises: causing a reaction between an aldehyde dichloride, a phenolic body and ammonia, the ammonia being present in sufficient quantity to combine with substantially all of the chlorine liberated in the reaction.

2. The process of producing a phenolic condensation product which comprises: reacting upon a phenolic body with an aldehyde dichloride in the presence of ammonia, the proportions being such as to afford substantially more than one phenolic group to each methylene group and the ammonia being taken in sufficient quantity to combine with substantially all of the chlorine of the aldehyde dichloride.

3. The process of producing a phenolic condensation product which comprises: heating a mixture of aldehyde dichloride and a phenolic body in the presence of ammonia taken in sufficient quantity to combine with substantially all of the liberated chlorine; and separating the ammonium chlorid formed from the resin formed.

4. The process of producing a phenolic condensation product which comprises: causing a reaction between an aldehyde dichloride, a phenolic body and ammonium hydroxide, the ammonium hydroxide being a dilute solution and being present in sufficient quantity to combine with substantially all of the chlorine liberated in the reaction.

5. The process of producing a phenolic condensation product which comprises: mixing an aldehyde dichloride, a phenolic body and a solution of ammonia; and subjecting the same to the action of heat and pressure.

6. The process of producing a phenolic condensation product which comprises: mixing an aldehyde dichloride, a phenolic body and a solution of ammonia; and subjecting the same to the action of heat and pressure, the temperature employed being not substantially lower than 100° C.

7. The process of producing a phenolic condensation product which comprises: heating an aldehyde dichloride, a phenolic body and a solution of ammonia, the phenolic body being taken in excess of the molecular proportions and the ammonia being taken in excess of the molecular proportions; and separating the ammonium chloride from the phenolic condensation product formed.

8. The process of producing a phenolic condensation product which comprises: causing a reaction between methylene chloride, a phenolic body and ammonia, the ammonia being present in sufficient quantity to combine with substantially all of the chlorine of the methylene chloride.

9. The process of producing a phenolic condensation product which comprises: causing a reaction between methylene chloride, a phenolic body and a soluiton of ammonia, the phenolic body being taken in excess of the molecular proportions and heat being applied to influence the reaction; separating the ammonium chloride formed from the resin formed; introducing into the resin a sufficient amount of an active methylene body to effect conversion to a final, infusible and substantially insoluble state; and applying heat to effect conversion to the final state.

10. The process of producing a phenolic condensation product which comprises: causing a reaction between an aldehyde dichloride, a phenolic body and ammonia, the ammonia being present in sufficient quantity to combine with substantially all of the chlorine of the aldehyde dichloride; separating the ammonium chloride from the resin formed; recovering the ammonia from the ammonium chloride; and using the recovered ammonia to treat a fresh mixture of phenolic body and aldehyde dichloride to produce a phenolic condensation product.

CARNIE B. CARTER.
ALBERT E. COXE.